(12) United States Patent
Maric et al.

(10) Patent No.: US 12,510,727 B2
(45) Date of Patent: *Dec. 30, 2025

(54) ELECTRONIC DEVICES WITH OPTICAL MODULE POSITIONING SYSTEMS

(71) Applicant: Apple Inc., Cupertino, CA (US)

(72) Inventors: Ivan S. Maric, Campbell, CA (US); Aidan N. Zimmerman, Poway, CA (US); David R. Cramer, Los Gatos, CA (US); Zechariah D. Feinberg, Austin, TX (US); Samuel A. Resnick, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/824,708

(22) Filed: Sep. 4, 2024

(65) Prior Publication Data

US 2024/0427112 A1 Dec. 26, 2024

Related U.S. Application Data

(63) Continuation of application No. 18/331,010, filed on Jun. 7, 2023, now Pat. No. 12,092,896, which is a continuation of application No. 17/218,001, filed on Mar. 30, 2021, now Pat. No. 11,714,256.

(60) Provisional application No. 63/016,125, filed on Apr. 27, 2020.

(51) Int. Cl.
*G02B 7/12* (2021.01)

(52) U.S. Cl.
CPC ..................... *G02B 7/12* (2013.01)

(58) Field of Classification Search
None
See application file for complete search history.

(56) References Cited

U.S. PATENT DOCUMENTS

| 5,815,126 A | 9/1998 | Fan et al. |
| 6,771,424 B1 | 8/2004 | Amafuji et al. |
| 8,638,498 B2 * | 1/2014 | Bohn .................. G02B 7/12 |
| | | 359/412 |

(Continued)

FOREIGN PATENT DOCUMENTS

| CN | 2724027 Y | 9/2005 |
| CN | 2819243 Y | 9/2006 |

(Continued)

*Primary Examiner* — Fred Tzeng
(74) *Attorney, Agent, or Firm* — Treyz Law Group, P.C.; Kendall P. Woodruff

(57) ABSTRACT

A head-mounted device may have optical modules that present images to a user's eyes. Each optical module may have a lens barrel with a display and a lens that presents an image from the display to a corresponding eye box. To accommodate users with different interpupillary distances, the optical modules may be slidably coupled to guide members such as guide rods. Actuators may slide the optical modules towards or away from each other along the guide rods. The guide rods may be formed from fiber-composite tubes with end caps that are fastened to a frame in the head-mounted device. The tubes may be partly or completely filled with cores to add strength. Low-friction coatings such as metal coatings may be formed on the fiber-composite tubes and the corresponding inner surfaces of the optical module structures that slidably engage the fiber-composite tubes.

20 Claims, 10 Drawing Sheets

(56) References Cited

U.S. PATENT DOCUMENTS

| | | | |
|---|---|---|---|
| 8,705,177 B1* | 4/2014 | Miao | H04N 13/395 |
| | | | 359/13 |
| 9,025,252 B2 | 5/2015 | Lewis et al. | |
| 9,398,847 B2* | 7/2016 | Newell | G02B 27/017 |
| 9,470,906 B2 | 10/2016 | Kaji et al. | |
| 9,986,229 B2* | 5/2018 | Wang | H04N 13/371 |
| 10,419,745 B2 | 9/2019 | Liu et al. | |
| 10,425,636 B2 | 9/2019 | Bohn | |
| 10,642,049 B2* | 5/2020 | Huo | H04N 13/344 |
| 10,823,970 B2 | 11/2020 | Franklin et al. | |
| 11,092,772 B2 | 8/2021 | Zheng et al. | |
| 11,137,612 B2 | 10/2021 | Jo et al. | |
| 11,195,495 B1* | 12/2021 | Franklin | G02B 27/0093 |
| 11,287,660 B2* | 3/2022 | Yu | G02B 27/0179 |
| 11,425,829 B2 | 8/2022 | Zheng et al. | |
| 11,763,779 B1* | 9/2023 | Kalinowski | H04N 23/90 |
| | | | 345/619 |
| 11,815,693 B2 | 11/2023 | Maric et al. | |
| 11,822,145 B2 | 11/2023 | Maric et al. | |
| 11,846,782 B1 | 12/2023 | Patton et al. | |
| 11,899,214 B1* | 2/2024 | Petrov | G06T 19/006 |
| 12,140,767 B2* | 11/2024 | Meursing | G02B 27/0172 |
| 12,196,964 B2* | 1/2025 | Young | G02B 27/017 |
| 2002/0163486 A1 | 11/2002 | Ronzani et al. | |
| 2007/0057867 A1* | 3/2007 | Mizuuchi | G02B 7/12 |
| | | | 345/8 |
| 2012/0206485 A1 | 8/2012 | Osterhout et al. | |
| 2013/0050065 A1* | 2/2013 | Shimizu | H04N 13/344 |
| | | | 345/8 |
| 2013/0123802 A1 | 5/2013 | Comber et al. | |
| 2013/0170031 A1* | 7/2013 | Bohn | G02B 30/36 |
| | | | 359/793 |
| 2015/0109576 A1* | 4/2015 | Krasnow | A61B 3/024 |
| | | | 351/204 |
| 2015/0138645 A1 | 5/2015 | Yoo et al. | |
| 2017/0102549 A1* | 4/2017 | Lee | G02B 27/0176 |
| 2017/0269376 A1 | 9/2017 | Liu | |
| 2017/0315367 A1 | 11/2017 | Maruyama et al. | |
| 2018/0213212 A1 | 7/2018 | Liu et al. | |
| 2018/0335605 A1 | 11/2018 | Chou et al. | |
| 2019/0041643 A1 | 2/2019 | Chang et al. | |
| 2019/0068944 A1 | 2/2019 | Zhang et al. | |
| 2019/0285897 A1 | 9/2019 | Topliss et al. | |
| 2020/0355928 A1* | 11/2020 | Dai | G02B 27/0093 |
| 2021/0096381 A1* | 4/2021 | Chang | G02B 27/0172 |
| 2021/0325623 A1 | 10/2021 | Islam | |
| 2021/0333823 A1 | 10/2021 | Maric et al. | |
| 2024/0077698 A1* | 3/2024 | Tao | G02B 7/12 |
| 2024/0184120 A1* | 6/2024 | Chan | G02C 9/00 |

FOREIGN PATENT DOCUMENTS

| | | |
|---|---|---|
| CN | 104317054 A | 1/2015 |
| CN | 108563021 A | 9/2018 |
| CN | 109324413 A | 2/2019 |
| CN | 209821509 U | 12/2019 |
| TW | M260738 U | 4/2005 |
| TW | 201937238 A | 9/2019 |
| WO | 2014100891 A1 | 7/2014 |
| WO | 2017061677 A1 | 4/2017 |
| WO | 2018158347 A1 | 9/2018 |

* cited by examiner

ELECTRONIC DEVICES WITH OPTICAL MODULE POSITIONING SYSTEMS

This application is a continuation of patent application Ser. No. 18/331,010, filed Jun. 7, 2023, which is a continuation of patent application Ser. No. 17/218,001, filed Mar. 30, 2021, now U.S. Pat. No. 11,714,256, which claims the benefit of provisional patent application No. 63/016,125, filed Apr. 27, 2020, all of which are hereby incorporated by reference herein in their entireties.

FIELD

This relates generally to electronic devices, and, more particularly, to electronic devices such as head-mounted devices.

BACKGROUND

Electronic devices such as head-mounted devices may have displays for displaying images. The displays may be housed in optical modules. Lenses may be mounted in the optical modules. Images on the displays may be viewed through the lenses.

SUMMARY

A head-mounted device may have optical modules that present images to a user's eyes. Each optical module may have a lens barrel with a display and a lens that presents an image from the display to a corresponding eye box.

To accommodate users with different interpupillary distances, the optical modules may be slidably coupled to guide members such as guide rods. Actuators may slide the optical modules towards or away from each other along the guide rods, thereby accommodating different interpupillary distances.

The guide rods may be formed from fiber-reinforced composite tubes with one or more end caps that are fastened to a frame in the head-mounted device. A common end cap may, if desired, be used to join a pair of guide rods. End caps may be formed as separate pieces that are attached to the ends of the fiber composite tubes or other guide rod structures and/or may be integral portions of the fiber composite tubes or other guide rod structures.

The guide rods may include a left guide rod or left pair of guide rods slidably engaged with a left optical module and a right guide rod or right pair of guide rods slidably engaged with a right optical module. Left and right guide rods may be angled at a non-zero angle with respect to each other to help guide the optical modules parallel to the surface of a user's face.

The tubes of the guide rods may be partly or completely filled with cores to add strength. Low-friction coatings such as metal coatings may be applied to the tubes and on corresponding inner surfaces of the optical module structures that receive the tubes.

DETAILED DESCRIPTION

An electronic device such as a head-mounted device may have a front face that faces away from a user's head and may have an opposing rear face that faces the user's head. Optical modules at the rear face may be used to provide images to a user's eyes. The positions of the optical modules may be adjusted to accommodate different user interpupillary distances. The head-mounted device may have actuators and optical module guide structures to allow the optical module positions to be adjusted.

Figure 1:
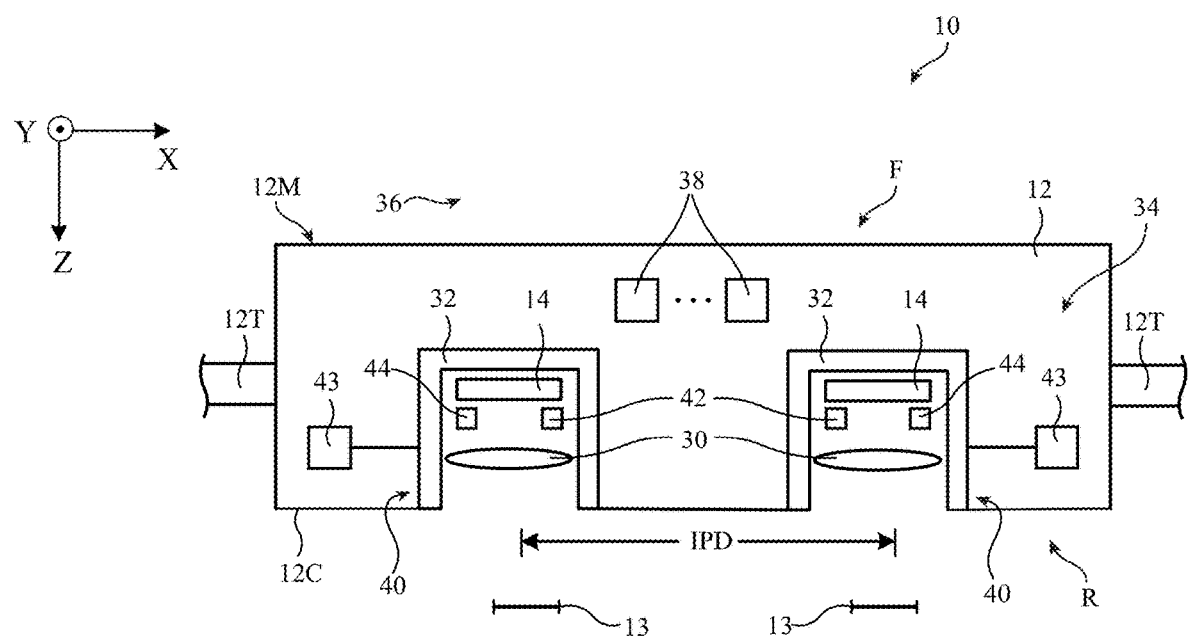
FIG. 1 is a top view of an illustrative head-mounted device in accordance with an embodiment.

A top view of an illustrative head-mounted device is shown in FIG. 1. As shown in FIG. 1, head-mounted devices such as electronic device 10 may have head-mounted support structures such as housing 12. Housing 12 may include portions (e.g., head-mounted support structures 12T) to allow device 10 to be worn on a user's head. Support structures 12T may be formed from fabric, polymer, metal, and/or other material. Support structures 12T may form a strap or other head-mounted support structures to help support device 10 on a user's head. A main support structure (e.g., main housing portion 12M) of housing 12 may support electronic components such as displays 14.

Main housing portion 12M may include housing structures formed from metal, polymer, glass, ceramic, and/or other material. For example, housing portion 12M may have housing walls on front face F and housing walls on adjacent top, bottom, left, and right side faces that are formed from rigid polymer or other rigid support structures and these rigid walls may optionally be covered with electrical components, fabric, leather, or other soft materials, etc. Housing portion 12M may also have internal support structures such as a frame and/or structures that perform multiple functions such as controlling airflow while providing structural support. The walls of housing portion 12M may enclose internal components 38 in interior region 34 of device 10 and may separate interior region 34 from the environment surrounding device 10 (exterior region 36). Internal components 38 may include integrated circuits, actuators, batteries, sensors, and/or other circuits and structures for device 10. Housing 12 may be configured to be worn on a head of a user and may form glasses, a hat, a helmet, goggles, and/or other head-mounted device. Configurations in which housing 12 forms goggles may sometimes be described herein as an example.

Front face F of housing 12 may face outwardly away from a user's head and face. Opposing rear face R of housing 12 may face the user. Portions of housing 12 (e.g., portions of main housing 12M) on rear face R may form a cover such as cover 12C (sometimes referred to as a curtain). The presence of cover 12C on rear face R may help hide internal housing structures, internal components 38, and other structures in interior region 34 from view by a user.

Device 10 may have left and right optical modules 40. Optical modules 40 support electrical and optical components such as light-emitting components and lenses and may therefore sometimes be referred to as optical assemblies, optical systems, optical component support structures, lens and display support structures, electrical component support structures, or housing structures. Each optical module may include a respective display 14, lens 30, and support structure such as lens barrel 32. Lens barrel 32, which may sometimes be referred to as lens support structures, optical component support structures, optical module support structures, or optical module portions, may include hollow cylindrical structures with open ends or other supporting structures to house displays 14 and lenses 30. Lens barrels 32 may, for example, include a left lens barrel that supports a left display 14 and left lens 30 and a right lens barrel that supports a right display 14 and right lens 30.

Displays 14 may include arrays of pixels or other display devices to produce images. Displays 14 may, for example, include organic light-emitting diode pixels formed on substrates with thin-film circuitry and/or formed on semiconductor substrates, pixels formed from crystalline semiconductor dies, liquid crystal display pixels, scanning display devices, and/or other display devices for producing images.

Lenses 30 may include one or more lens elements for providing image light from displays 14 to respective eyes boxes 13. Lenses may be implemented using refractive glass lens elements, using mirror lens structures (catadioptric lenses), using Fresnel lenses, using holographic lenses, and/or other lens systems.

When a user's eyes are located in eye boxes 13, displays (display panels) 14 operate together to form a display for device 10 (e.g., the images provided by respective left and right optical modules 40 may be viewed by the user's eyes in eye boxes 13 so that a stereoscopic image is created for the user). The left image from the left optical module fuses with the right image from a right optical module while the display is viewed by the user.

It may be desirable to monitor the user's eyes while the user's eyes are located in eye boxes 13. For example, it may be desirable to use a camera to capture images of the user's irises (or other portions of the user's eyes) for user authentication. It may also be desirable to monitor the direction of the user's gaze. Gaze tracking information may be used as a form of user input and/or may be used to determine where, within an image, image content resolution should be locally enhanced in a foveated imaging system. To ensure that device 10 can capture satisfactory eye images while a user's eyes are located in eye boxes 13, each optical module 40 may be provided with a camera such as camera 42 and one or more light sources such as light-emitting diodes 44 or other light-emitting devices such as lasers, lamps, etc. Cameras 42 and light-emitting diodes 44 may operate at any suitable wavelengths (visible, infrared, and/or ultraviolet). As an example, diodes 44 may emit infrared light that is invisible (or nearly invisible) to the user. This allows eye monitoring operations to be performed continuously without interfering with the user's ability to view images on displays 14.

Not all users have the same interpupillary distance IPD. To provide device 10 with the ability to adjust the interpupillary spacing between modules 40 along lateral dimension X and thereby adjust the spacing IPD between eye boxes 13 to accommodate different user interpupillary distances, device 10 may be provided with optical module positioning systems in housing 12. The positioning systems may have guide members and actuators 43 that are used to position optical modules 40 with respect to each other.

Actuators 43 can be manually controlled and/or computer-controlled actuators (e.g., computer-controlled motors) for moving lens barrels 32 relative to each other. Information on the locations of the user's eyes may be gathered using, for example, cameras 42. The locations of eye boxes 13 can then be adjusted accordingly.

Figure 2:
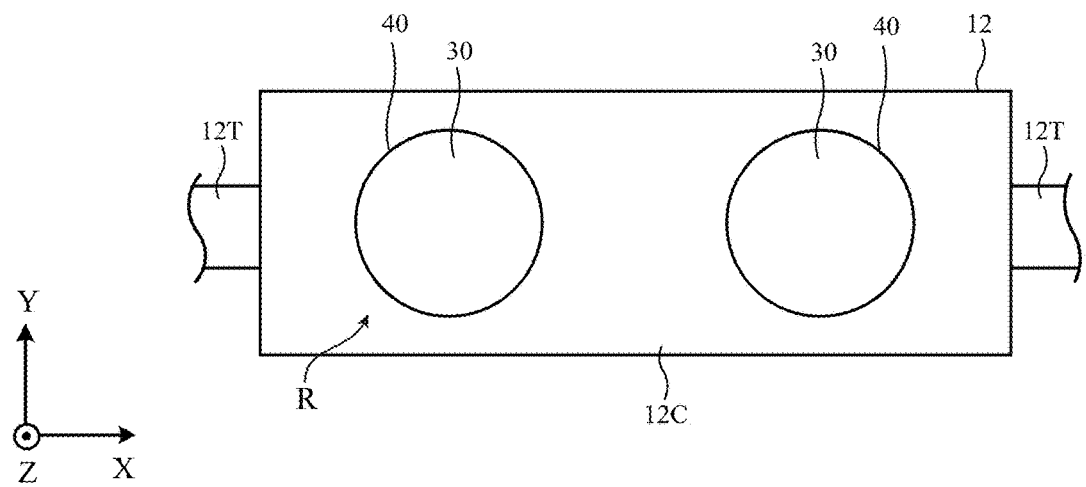
FIG. 2 is a rear view of an illustrative head-mounted device in accordance with an embodiment.

As shown in the rear view of device 10 of FIG. 2, cover 12C may cover rear face R while leaving lenses 30 of optical modules 40 uncovered (e.g., cover 12C may have openings that are aligned with and receive modules 40). As modules 40 are moved relative to each other along dimension X to accommodate different interpupillary distances for different users, modules 40 move relative to fixed housing structures such as the walls of main portion 12M and move relative to each other.

Figure 3:
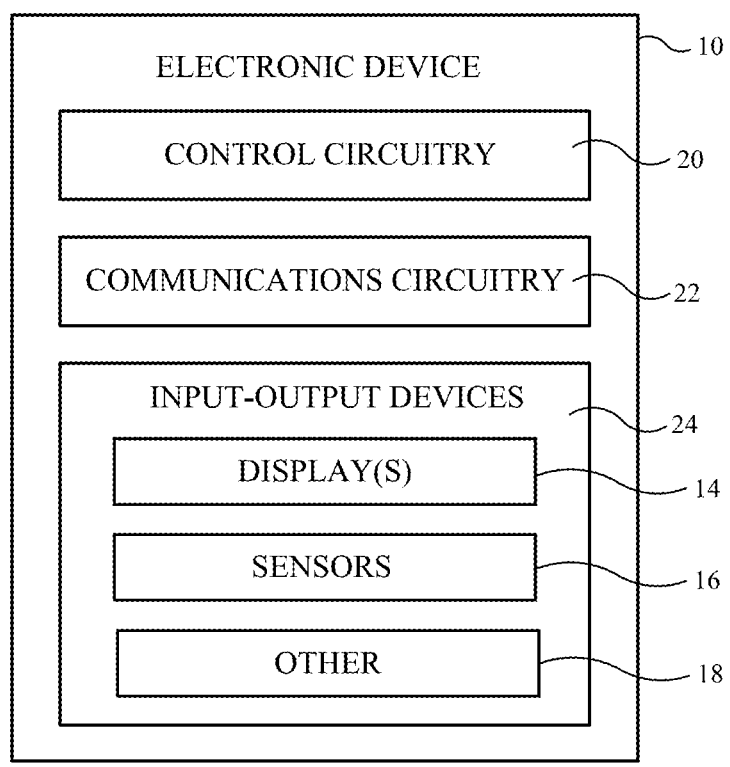
FIG. 3 is a schematic diagram of an illustrative head-mounted device in accordance with an embodiment.

A schematic diagram of an illustrative electronic device such as a head-mounted device or other wearable device is shown in FIG. 3. Device 10 of FIG. 3 may be operated as a stand-alone device and/or the resources of device 10 may be used to communicate with external electronic equipment. As an example, communications circuitry in device 10 may be used to transmit user input information, sensor information, and/or other information to external electronic devices (e.g., wirelessly or via wired connections). Each of these external devices may include components of the type shown by device 10 of FIG. 3.

As shown in FIG. 3, a head-mounted device such as device 10 may include control circuitry 20. Control circuitry 20 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 20 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc. During operation, control circuitry 20 may use display(s) 14 and other output devices in providing a user with visual output and other output.

To support communications between device 10 and external equipment, control circuitry 20 may communicate using communications circuitry 22. Circuitry 22 may include antennas, radio-frequency transceiver circuitry, and other wireless communications circuitry and/or wired communications circuitry. Circuitry 22, which may sometimes be referred to as control circuitry and/or control and communications circuitry, may support bidirectional wireless communications between device 10 and external equipment (e.g., a companion device such as a computer, cellular telephone, or other electronic device, an accessory such as a point device, computer stylus, or other input device, speakers or other output devices, etc.) over a wireless link. For example, circuitry 22 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link. Wireless communications may, for example, be supported over a Bluetooth® link, a WiFi® link, a wireless link operating at a frequency between 10 GHz and 400 GHz, a 60 GHz link, or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Device 10 may include input-output devices such as devices 24. Input-output devices 24 may be used in gathering user input, in gathering information on the environment surrounding the user, and/or in providing a user with output. Devices 24 may include one or more displays such as display(s) 14. Display(s) 14 may include one or more display devices such as organic light-emitting diode display panels (panels with organic light-emitting diode pixels formed on polymer substrates or silicon substrates that contain pixel control circuitry), liquid crystal display panels, microelectromechanical systems displays (e.g., two-dimensional mirror arrays or scanning mirror display devices), display panels having pixel arrays formed from crystalline semiconductor light-emitting diode dies (sometimes referred to as microLEDs), and/or other display devices.

Sensors 16 in input-output devices 24 may include force sensors (e.g., strain gauges, capacitive force sensors, resistive force sensors, etc.), audio sensors such as microphones, touch and/or proximity sensors such as capacitive sensors such as a touch sensor that forms a button, trackpad, or other input device), and other sensors. If desired, sensors 16 may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, iris scanning sensors, retinal scanning sensors, and other biometric sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors such as blood oxygen sensors, heart rate sensors, blood flow sensors, and/or other health sensors, radio-frequency sensors, depth sensors (e.g., structured light sensors and/or depth sensors based on stereo imaging devices that capture three-dimensional images), optical sensors such as self-mixing sensors and light detection and ranging (lidar) sensors that gather time-of-flight measurements, humidity sensors, moisture sensors, gaze tracking sensors, electromyography sensors to sense muscle activation, facial sensors, and/or other sensors. In some arrangements, device 10 may use sensors 16 and/or other input-output devices to gather user input. For example, buttons may be used to gather button press input, touch sensors overlapping displays can be used for gathering user touch screen input, touch pads may be used in gathering touch input, microphones may be used for gathering audio input (e.g., voice commands), accelerometers may be used in monitoring when a finger contacts an input surface and may therefore be used to gather finger press input, etc.

If desired, electronic device 10 may include additional components (see, e.g., other devices 18 in input-output devices 24). The additional components may include haptic output devices, actuators for moving movable housing structures, audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communication with ancillary equipment and for receiving wired power, and other circuitry.

Figure 4:
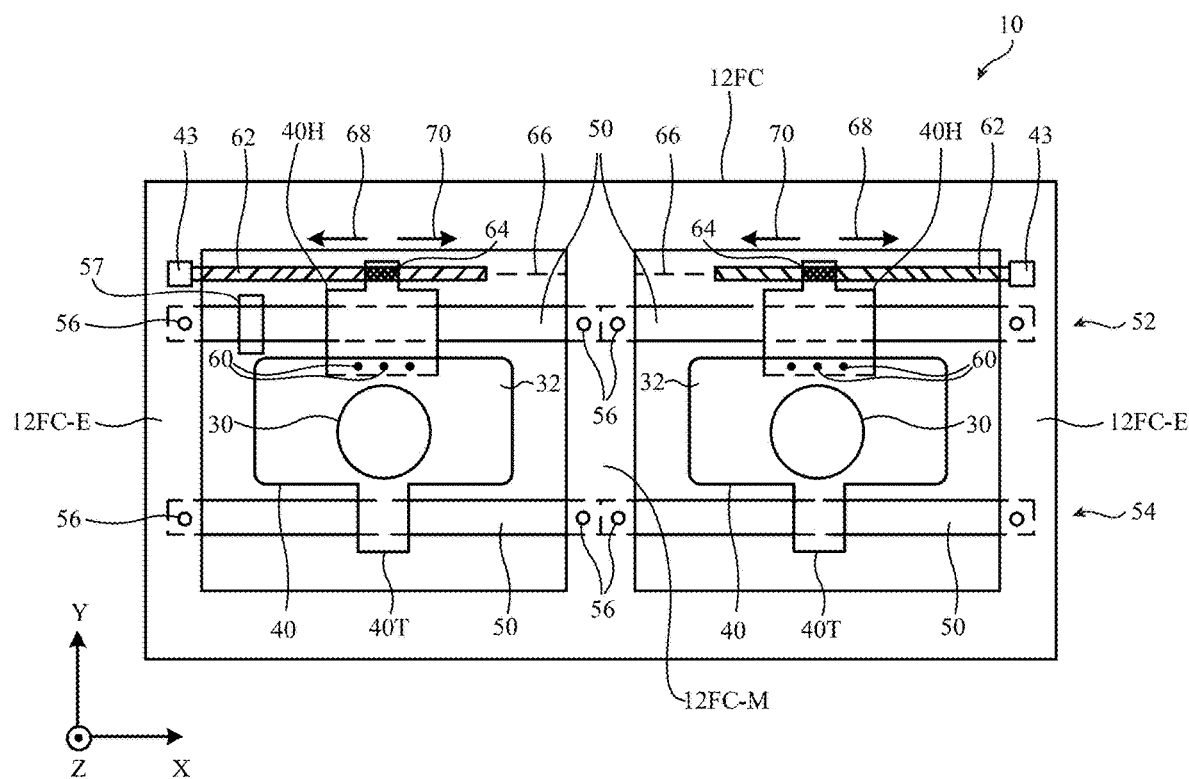
FIG. 4 is a rear view of an interior portion of an illustrative head-mounted device in accordance with an embodiment.

A rear view of device 10 is shown in FIG. 4. In the example of FIG. 4, cover 12C has been removed to expose internal housing structures such as frame 12FC. Frame 12FC may be formed from polymer support structures, support structurers formed from carbon-fiber composite and/or other fiber-composite materials, metal support structures, glass housing structures, and/or other support structures for main housing portion 12M. Portions of frame 12FC that run horizontally (along the upper and lower edges of device 10 parallel to the X axis of FIG. 4) may be joined by vertically extending edge portions of frame 12FC (see, e.g., frame edge portions 12FC-E) along the left and right sides of device 10 and may be joined in the center of device 10 by a vertically extending nose bridge portion (see, e.g., frame center portion 12FC-M).

Optical modules 40 may be guided using optical module guide structures such as optical module guide rods 50. Guide rods 50 may extend horizontally across device 10 (e.g., parallel to the X axis of FIG. 4). In the example of FIG. 4, guide rods 50 include an upper set of left and right guide rods at upper position 52 and a lower set of left and right guide rods at lower position 54. There may be more guide rods or fewer guide rods in device 10, if desired. Fasteners 56 (e.g., screws) or other attachment structures (e.g., adhesive, welds, etc.) may be used to attach guide rods 50 to frame 12FC. The fasteners may, as an example, attach the ends of rods 50 that are located on the left of device 10 between left frame edge portion 12FC-E and frame center portion 12FC-M and may attach the ends of rods 50 that are located on the right of device 10 between right frame edge portion 12FC-E and frame center portion 12FC-M. Guide rods 50 may also be attached to the frame or to an intermediary subframe. Guide rods may be fixed to a frame or subframe at both ends (as illustrated) or each guide rod may only be attached to the frame at a single end. For example, each guide rod may only be fixed to the frame at a central portion of the frame.

Each optical module may have portions that slidably engage guide rods 50. For example, each optical module 40 may have an upper guide rod engagement portion (sometimes referred to as a hanger or hanger portion) such as optical module portion 40H that receives and engages a respective guide rod 50 at upper guide rod position 52. Each optical module 40 may also have a lower guide rod engagement portion (sometimes referred to as a toe or toe portion) such as optical module portion 40T that receives and engages a respective guide rod 50 at lower guide rod position 54. Portion 40T may be an integral portion of lens barrel 32 or other support structure for optical module 40 or may be formed from one or more separate structures attached to lens barrel 32. Portion 40H may be an integral portion of lens barrel 32 or may, as shown in FIG. 4, be formed from one or more separate optical module structures that are attached to lens barrel 32 by fasteners 60 (e.g., screws). If desired, guide rods 50 may be provided with structures that serve as stops to prevent overtravel of optical modules 40. As an example, each of guide rods 50 may have one or more stop structures such as plug 57. During sliding movement of optical module 40, excessive movement will be prevented when portion 40H contacts plug 57 and is thereby stopped by plug 57. Optical module sliding motion stop structures such as plug 57 may be attached to guide rods 50 by screwing, by welding, using adhesive, or using other attachment structures. Plug 57 may be a separate structure from rods 50 or such structures may be formed as part of guide rods 50 (e.g., a metal guide rod or other guide rod may be machined or otherwise formed into a shape that includes an integral sliding motion stop structure).

Guide rods 50 may have circular cross-sectional shapes (when viewed in the Y-Z plane of FIG. 4) or may have other suitable cross-sectional shape. The portions of optical module 40 that receive guide rods 50 may have corresponding mating shapes (e.g., full or partial circular openings with inner diameters corresponding to the outer diameters of guide rods 50). To prevent sticking, the inner surfaces of the optical module guide rod openings and/or the outer surfaces of guide rods 50 may be provided with low stick surfaces (e.g., using low-stick coatings, lubricant such as grease, etc.).

Actuators 43 may have associated threaded members such as threaded actuator rods 62. Optical module portions 40H may have corresponding threaded nuts 64 or other threaded portions that receive threaded actuator rods 62. During operation, actuators 43 may rotate threaded actuator rods 62 about actuator rod rotational axes 66, thereby moving optical modules 40 outwardly (away from each other) in directions 68 or inwardly (towards each other) in directions 70 as desired to adjust the positions of optical modules 40 relative to each other (e.g., to adjust the lens-center-to-lens-center spacing of the left and right lenses in device 10 to accommodate different interpupillary distances for different users).

Figure 5:
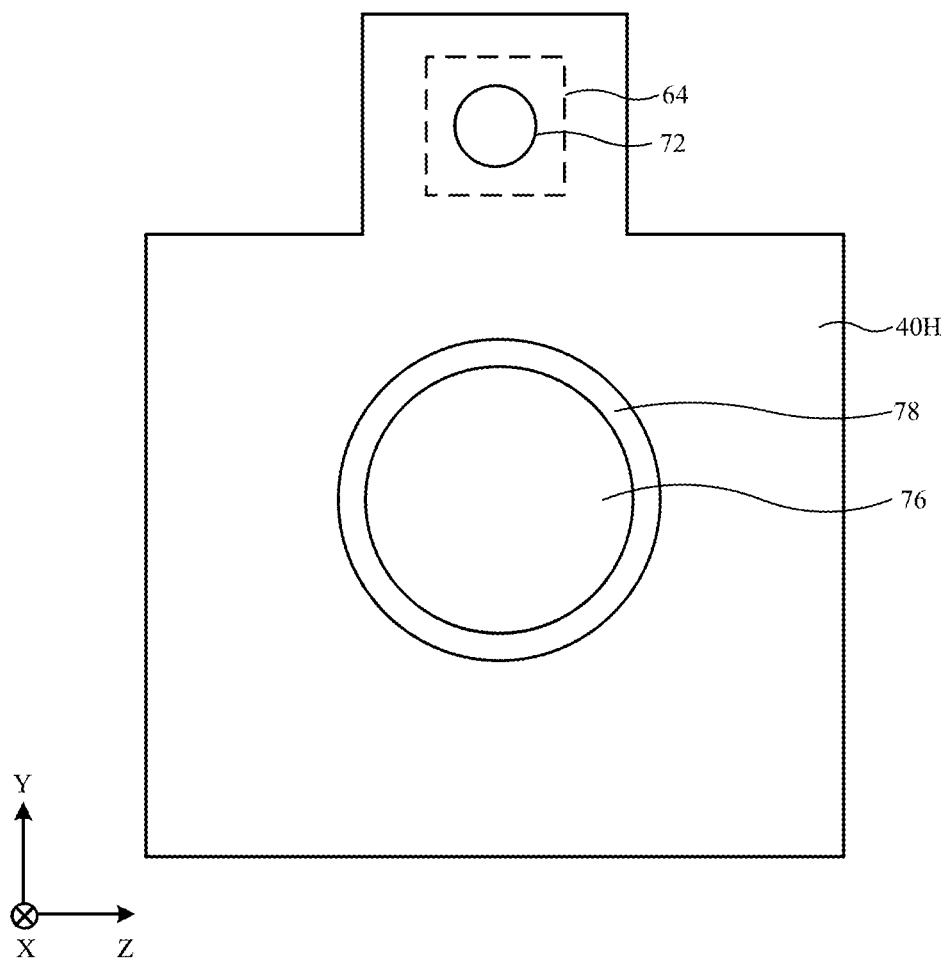
FIG. 5 is a side view of an illustrative portion of an optical module that is configured to receive a guide rail and a threaded actuator rod in accordance with an embodiment.

FIG. 5 is an end view of an illustrative portion of optical module 40 such as portion 40H of FIG. 4. As shown in FIG. 5, optical module portion 40H may have a first opening such as opening 72 (e.g., a threaded opening in nut 64 or other portion of optical module portion 40H). Opening 72 may receive threaded rod 62.

Optical module portion 40H may also have a second opening such as opening 76. Opening 76 may receive a guide rod (e.g., a guide rod located at upper position 52). If desired, optical module portion 40T may have an opening such as opening 76 to receive a guide rod (e.g., a guide rod located at lower position 54). As shown in FIG. 5, the inner surfaces of opening 76 may have one or more layers of material that form low-friction coating 78. In an illustrative configuration, optical module 40 (e.g., optical module portion 40H, lens barrel 32, and/or optical module portion 40T) are formed from metal (e.g., aluminum) and coating 78 is formed from one or more deposited (e.g., electrodeposited) metal layers (e.g., nickel, etc.). Configurations in which modules 40 are formed from polymer coated with metal and/or in which modules 40 are formed from other materials may be used, if desired.

Guide rods 50 may be formed from elongated guide member structures such as tubes. The tubes may be cylindrical tubes or may be tubes of other suitable shapes (e.g., tubes with rectangular cross-sectional shapes, etc.). Guide rods 50 may be formed from tubes that are completed hollow, that are partly hollow and partly filled with cores, or tubes that are completely filled with filler material (e.g., rods that are formed from tubes entirely filled with a core material that differs in composition, density, method of fabrication, or other respects from the material of the tubes such as a composite core material formed from fibers or other structures embedded in polymer, rods that are formed from a single material such as solid cylindrical rods, solid composite rods of fiber-composite material such as solid cylindrical composite rods, rods formed from other composites, solid rods of metal or polymer, etc.). The use of tubes that are at least partly hollow may help save weight and thereby help enhance the comfort of a user wearing device 10.

Figure 6:
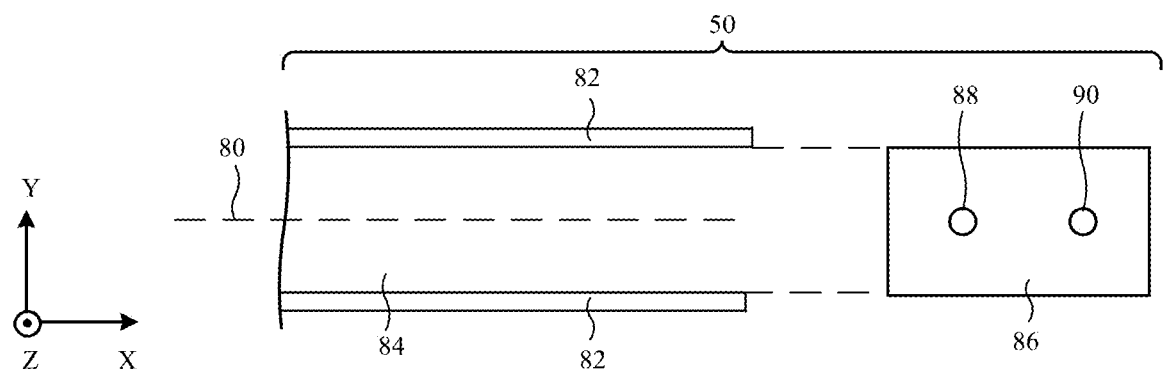
FIG. 6 is an exploded cross-sectional view of an illustrative guide rod and end cap in accordance with an embodiment.

FIG. 6 is a cross-sectional view of an illustrative guide rod. As shown in FIG. 6, guide rod 50 may include guide rod tube 82 and a guide rod end member such as end cap 86. Guide rod tube 82 may be hollow and may be characterized by cylindrical walls surrounding interior 84. In the example of FIG. 6, tube 82 extends along longitudinal axis 80 and is rotationally symmetric around axis 80 (e.g., tube 82 is cylindrical). End cap 86 may be attached to the end of tube 82 using adhesive, fasteners, welds, by molding polymer end cap material over the end of tube 82, and/or other attachment mechanisms. In an illustrative configuration, end cap 86 may have a first opening such as opening 88 (e.g., a through-hole opening) to receive a first fastener (e.g., a first screw) and may have a second opening such as opening 90 (e.g., a through-hole opening) to receive a second fastener (e.g., a second screw). The first screw may be used to attach end cap 86 to the end of tube 82 and the second screw may be used to attach end cap 86 to main housing portion 12M (e.g., frame 12FC). Other numbers of end cap openings and/or different features (e.g., threads) in end cap 86 for attaching end cap 86 to the end of tube 82 may be used, if desired.

Figure 7:
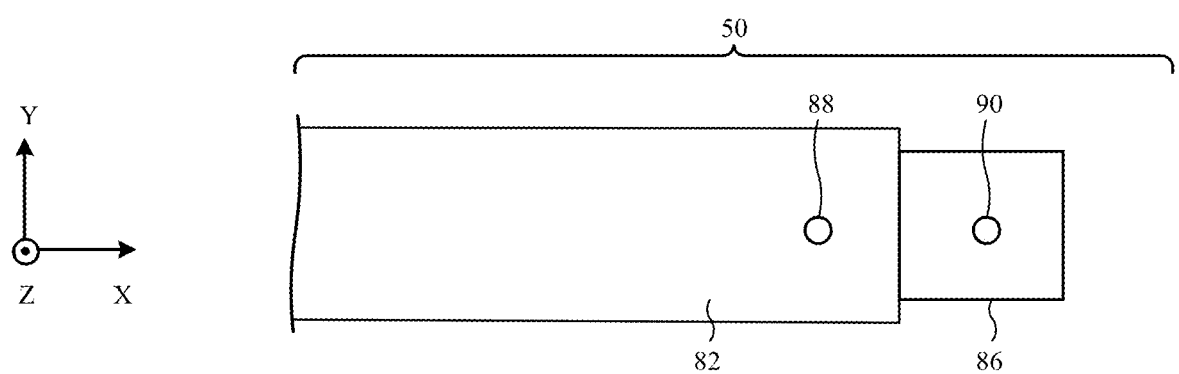
FIG. 7 is a side view of the illustrative guide rod of FIG. 6 following attachment of the end cap in accordance with an embodiment.

FIG. 7 is a side view of guide rod 50 of FIG. 7 following insertion of end cap 86 into the end of tube 82. The portion of end cap 86 that is inserted into tube 82 may have an outer diameter that corresponds to the inner diameter of tube 82.

Figure 8:
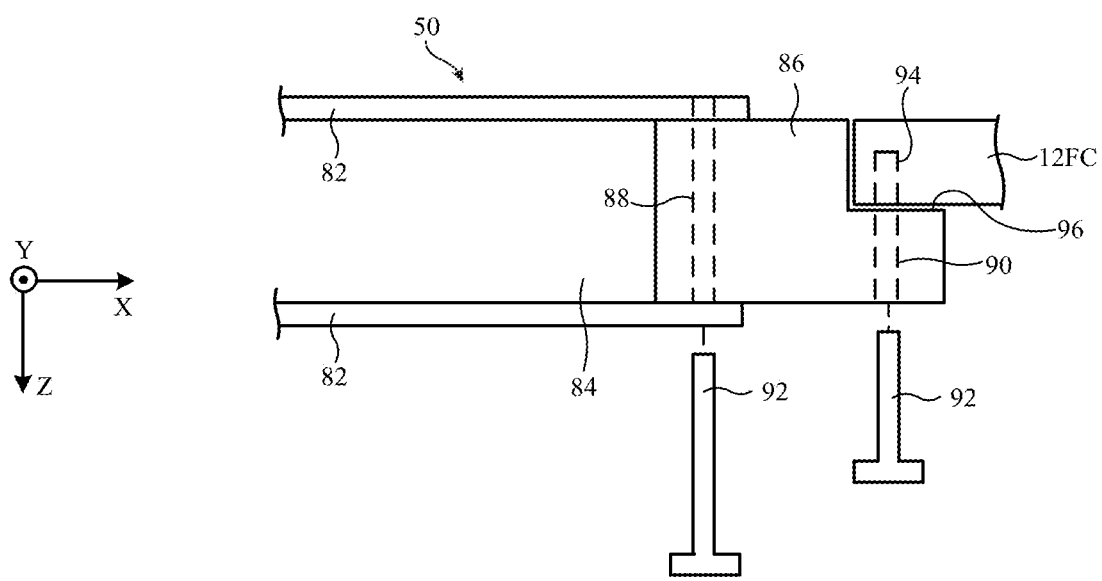
FIG. 8 is a cross-sectional top view of the illustrative guide rod of FIGS. 6 and 7 showing how the guide rod may be mounted to a housing structure such as a frame in head-mounted support structures in accordance with an embodiment.

As shown in the cross-sectional view of FIG. 8, fasteners 92 (e.g., screws) may be received by opening 88 (to attach end cap 86 to tube 82) and opening 90 (to attach end cap 86 and the rest of guide rod 50 to a housing structure such as frame 12FC (e.g., by screwing a threaded end of the fastener passing through opening 90 into threaded frame opening 94. If desired, end cap 86 may have a flattened surface portion such as planar surface 96 that rests against a corresponding planar portion of frame 12FC when end cap 86 is attached to frame 12FC. The presence of mating planar surfaces may help prevent undesired rotation of guide rod 50 about axis 80.

Figure 9:
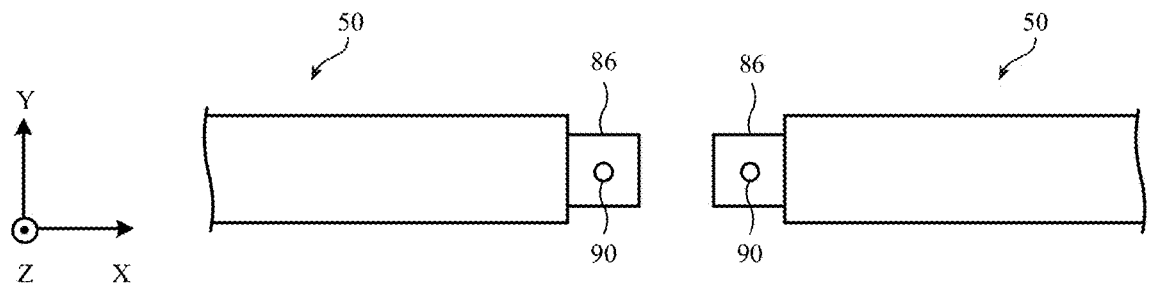
FIGS. 9, 10, 11, and 12 are views of illustrative guide rods in accordance with embodiments.
Figure 10:
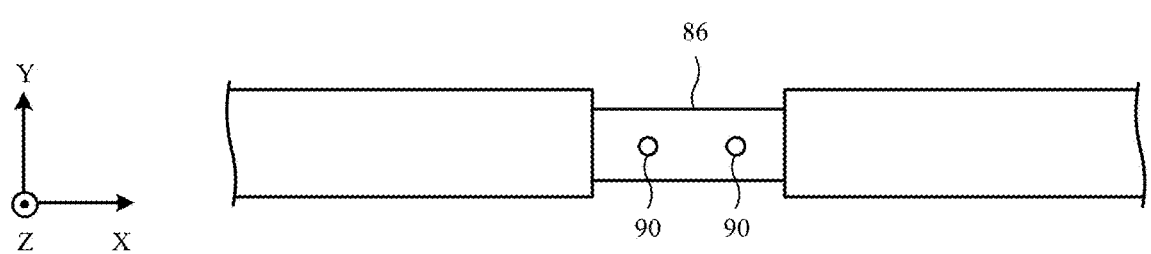
Figure 11:
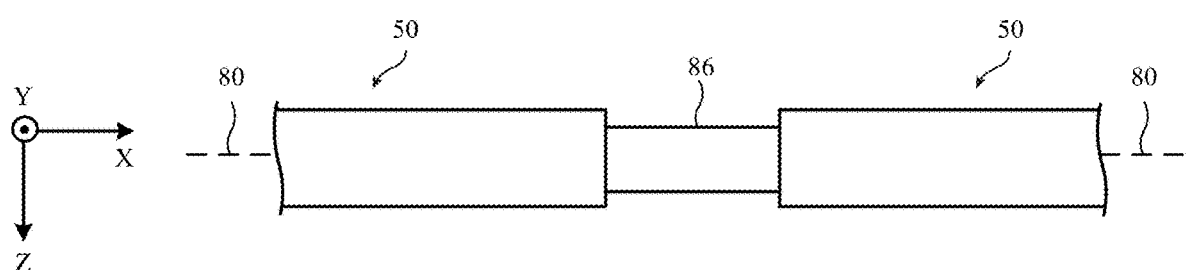
Figure 12:
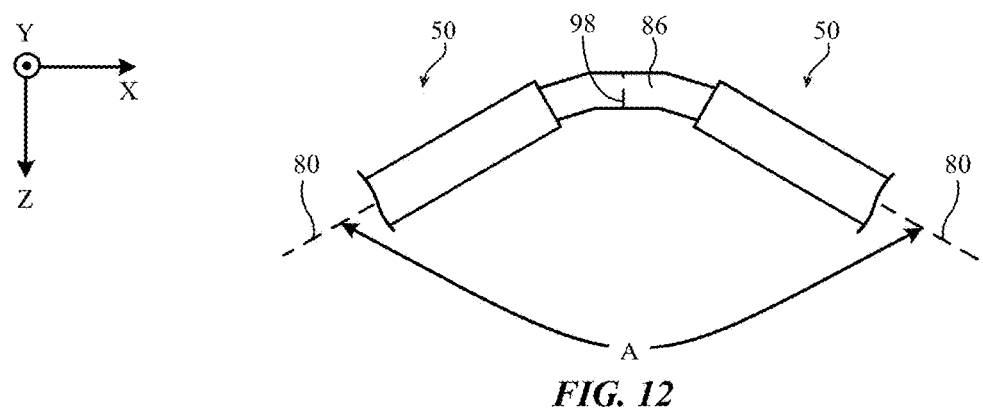

As shown in FIG. 4, device 10 may have left and right guide rods (e.g., upper left and right guide rods and lower left and right guide rods). Left and right guide rods 50 may have separate end caps 86 each with a respective opening 90, as shown in FIG. 9, or left and right guide rods 50 may share a common end cap 86 with one or more openings 90, as shown in FIG. 10. A shared end cap may be straight (e.g., so that axes 80 of the left and right guide rods are parallel and aligned with each other as shown by straight end cap 86 of FIG. 11) or a shared end cap may be bent (e.g., so that axes 80 of the left and right guide rods are not parallel and instead are angled at a non-zero angle A with respect to each other as shown by bent end cap 86 of FIG. 12). Bent end cap structures such as the bent end cap of FIG. 12 may be formed from single pieces of metal (or other material) or may be formed from two members (e.g., two metal members) joined by a welded joint (e.g., a laser weld), an adhesive joint, or other bond 98. The use of separate or common end cap structures to orient the left and right guide rods 50 at a non-zero angle A with respect to each other (e.g., an angle A of at least 3°, at least 6°, at least 9°, at least 15°, at least 20°, at least 30°, at least 40°, less than 50°, less than 45°, less than 35°, less than 25°, and/or less than 15°) may help orient the left and right optical modules of device 10 in front of the left and right sides of the user's face (which tend to angle away from each other slightly). Left and right guide rods may also be made from a single tube. The single tube may be straight (e.g., left and right guide rods may be formed from respective left and right portions of a single straight tube) or the left and right guide rods may be formed from respective left and right portions of a single tube that has been molded or bent so that the left and right guide rods are oriented at a non-zero angle A with respect to each other.

If desired, rods 50 may be attached to housing 12M (e.g., frame 12FC) using press-fit connections between rods 50 and housing 12M, using shrink-fit connections between rods 50 and housing 12M, and/or using other attachment mechanisms such as gluing (e.g., gluing rods 50 to housing 12M). In some arrangements, some or all of end caps 86 may be omitted (e.g., to help reduce weight). For example, housing 12M (e.g., frame 12FC) may include portions that are configured to be received within the cylindrical hollow interior of rods 50 at the ends of rods 50 (e.g., housing 12M may have integral housing portions with the shapes of end caps 86 that attach to the insides of rods 50 using a friction fit from a press-fit or shrink-fit connection and/or using adhesive), housing 12M may include portions that are configured to form cylindrical openings or other shapes (e.g., clamp shapes) that receive the ends of rods 50 (e.g., rods 50 may be inserted within openings in housing 12M to attach to the outer surfaces of the ends of rods 50 to housing 12M with a friction fit and/or adhesive), and/or other housing structures (e.g., portions of housing 12M such as portions of frame 12FC) that mount rods 50 to housing 12M directly.

Figure 13:
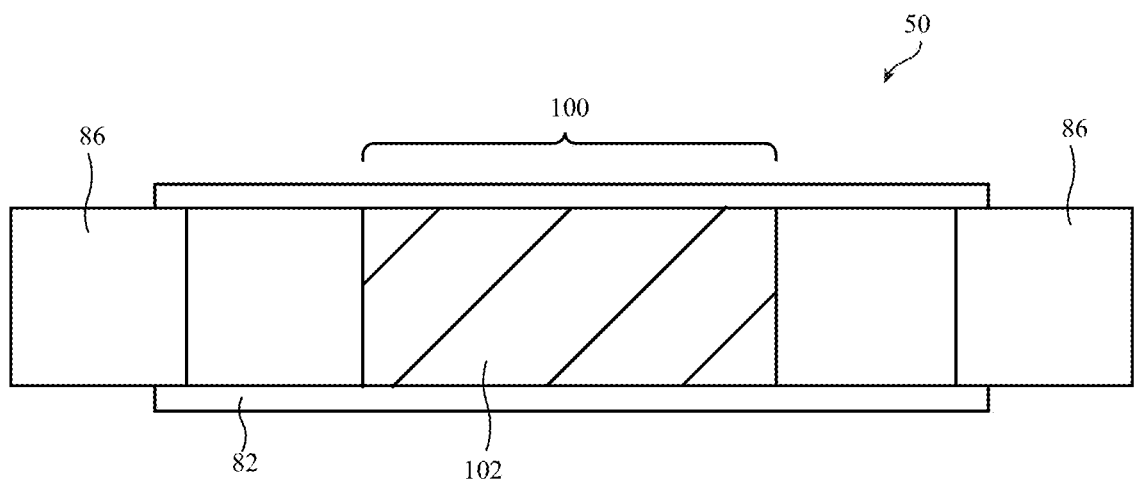
FIG. 13 is a cross-sectional side view of an illustrative guide rod tube that has been partially filled with a core in accordance with an embodiment.

If desired, some or all of the interior of each guide rod tube may be filled with supporting material. Consider, as an example, guide rod 50 of FIG. 13. As shown in FIG. 13, each guide rod 50 in device 10 may have a pair of end caps 86 (one at each of the opposing ends of guide rod tube 82). At one or more locations along the length of tube 82 such as illustrative location 100, tube 82 may be provided with a solid supportive core such as core 102 (e.g., a polymer core such as a cylindrical rod-shaped polymer foam core, a gel core, low-density thermoplastic polymer, or other low-density core of polymer, a metal core, a wood core, or a core formed from other supportive structures). Location 100 may correspond to the center portion of tube 82 over which openings in optical module 40 such as opening 76 travel (as an example). Core 102 may be shear-coupled to the inner surface of tube 82 and may help provide guide tube 50 with bending strength and torsional strength.

Tube 82 may be formed from metal, polymer, and/or fiber-composite material such as carbon-fiber material, fiberglass material (e.g., glass-fiber-reinforced structural polymer), other fiber-reinforced polymer, etc. The use of fiber-composite tubes may help reduce the weight of rods 50.

Figure 14:
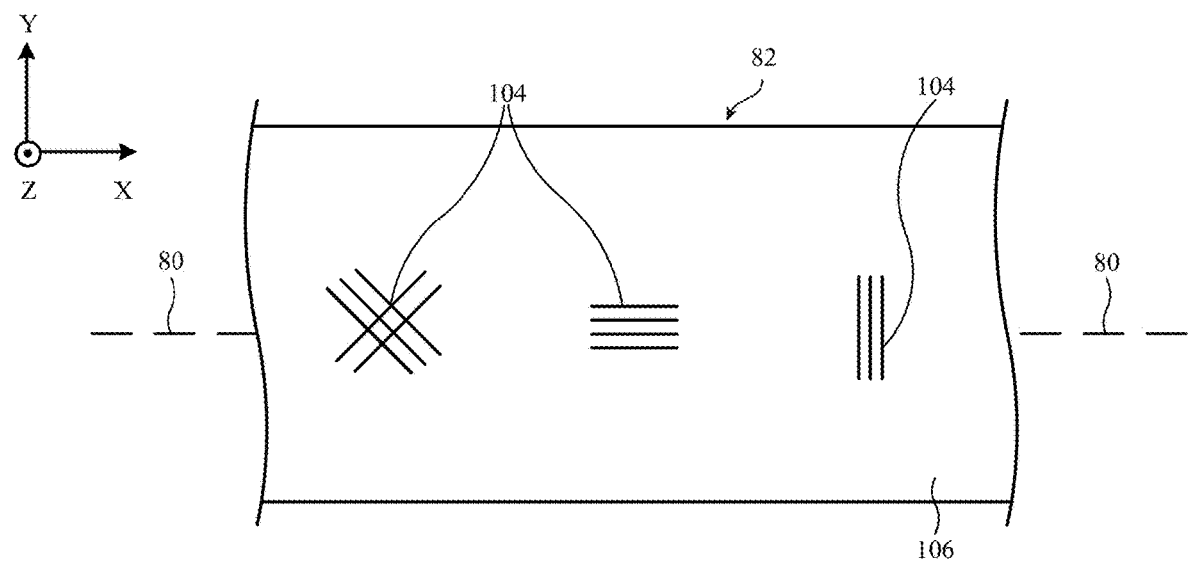
FIG. 14 is a top view of a portion of an illustrative guide rod formed from fiber-composite material in accordance with an embodiment.
Figure 15:
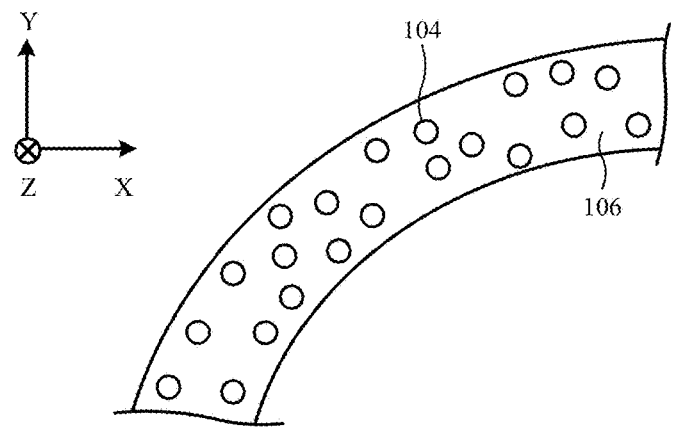
FIG. 15 is a cross-sectional end view of an illustrative portion of a guide rod formed from fiber-composite material in accordance with an embodiment.

Consider, as an example, tube 82 of FIGS. 14 and 15. As shown in the side view of FIG. 14 and the cross-sectional end view of FIG. 15, fiber-composite tube 82 of FIGS. 14 and 15 may have fibers 104 embedded in polymer 106. Fibers 104 may be carbon fibers, glass fibers, or other strands of material for enhancing the strength of polymer 106. Polymer 106, which may sometimes be referred to as binder or resin, may be epoxy, polyether ether ketone (PEEK), a thermoset polymer, a thermoplastic polymer, and/or other polymer material. Materials such as PEEK may exhibit satisfactory wear properties and a low coefficient of friction. Other polymers may be used for forming binder for tube 82 if desired.

Fibers 104 may extend in one or more different directions. For example, fibers 104 may include fibers that extend longitudinally (parallel to tube longitudinal axis 80), that wrap around the circumference of tube 84 (e.g., about axis 80), and/or that have angled orientations (e.g., +/−45°) relative to axis 80. These different types of fiber may be formed in a single layer of fibers or multiple layers of fiber may overlap in a stack. The stack of fiber layers may wrap around tube 82 and may optionally be covered with a low-friction coating.

Figure 16:
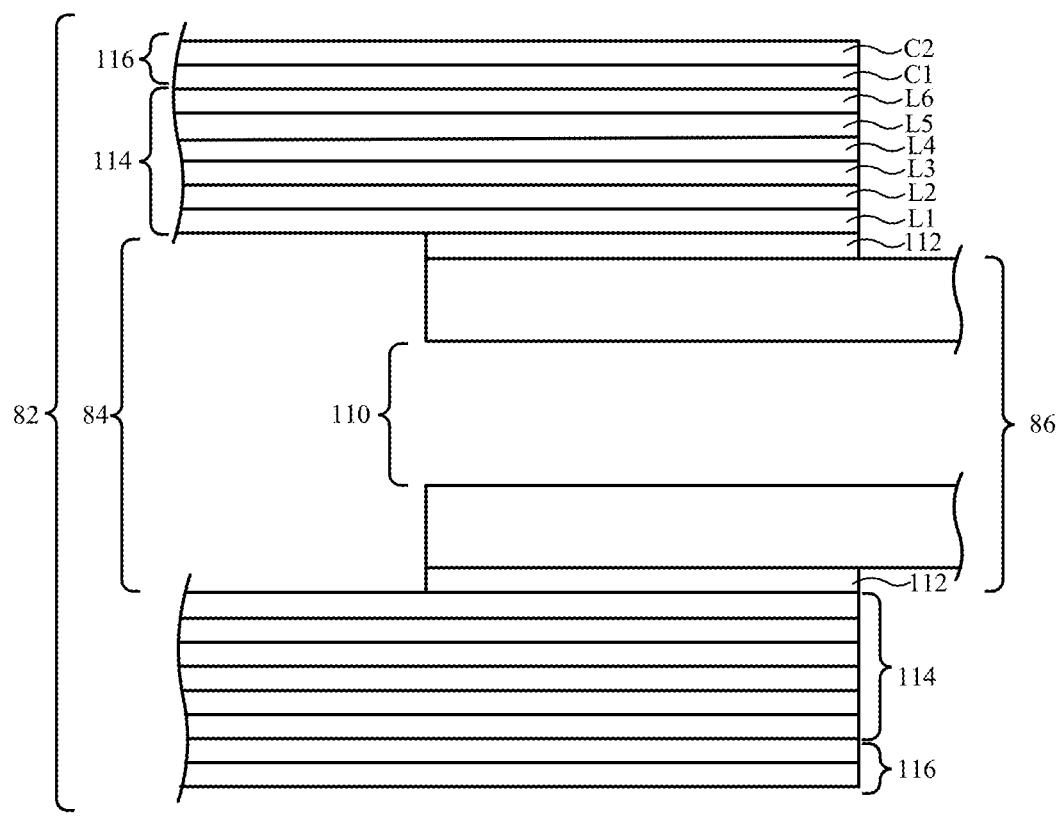
FIG. 16 is a cross-sectional side view of an illustrative end portion of a guide rod in accordance with an embodiment.

Consider, as an example, the fiber-composite guide rod tube in the cross-sectional side view of FIG. 16. In the example of FIG. 16, guide rod 50 includes tube 82 and end cap 86. End cap 86 has a hollow tube shape with hollow interior region 110. The outer diameter of end cap 86 (which includes a hollow portion in the example of FIG. 16) corresponds to the inner diameter of tube 82. A layer of optional adhesive 112 may be used to help attach end cap 86 to tube 82.

Tube 82 is hollow and surrounds interior region 84. Tube 82 has a hollow cylindrical fiber-composite tube portion formed (in the example of FIG. 16) from fiber-composite layers 114 covered with low-friction coating 116. Layers 114 form a hollow cylindrical fiber-composite tube surrounding interior 84. There may be any suitable number N of fiber layers in the tube formed from layers 114 (e.g., N may be at least one, at least three, at least four, at least six, less than ten, less than eight, less than seven, 3-8, etc.). Fiber composite layers 114 in the example of FIG. 16 include six fiber-composite layers: L1, L2, L3, L4, L5, and L6. These layers may have uniaxially aligned fibers and may have fibers that are oriented at 0°, 90°, 0°, 0°, 90°, and 0°, respectively relative to axis 80. Configurations in which layers 144 include fibers oriented at +/−45° or other angles may also be used. Fibers oriented along the length of tube 82 may enhance bend strength. Fibers that wrap around tube 82 perpendicular to axis 80 may enhance tube strength. Fibers oriented at +/−45° may enhance torsional rigidity. If desired, different portions along the length of tube 82 may have different fiber orientations and/or different number of fiber layers.

Coating layer 116 may, if desired, be formed from one or more metal layers. As an example, first (inner) metal layer C1 may be a nickel cobalt layer that has a thickness of 50 microns or other suitable thickness and second (outer) metal layer C2 may be an electroless nickel layer that is deposited on top of the nickel cobalt layer and has a thickness of 50-400 microns thick, 100-200 microns thick, or other suitable thickness. Layer C1 may serve as an adhesion promotion layer. The outer surface of layers 114 may be etched prior to coating layers 114 with layer C1 to enhance adhesion of layer C1 to layers 114. Layer C1 may interlock with epoxy (or other polymer) in layers 114 and may enhance adhesion of layer C2. Layer C2 may help provide tube 82 with low friction as tube 82 moves back and forth within an opening in portion 40H or 40T of optical module 40 (see, e.g., opening 76 of FIG. 5, which may have a nickel coating or other low-friction coating 78). The thickness of layer C2 may help enhance the strength of tube 82 (e.g., bending strength).

By using guide rods 50, the lateral positions of modules 40 in device 10 may be adjusted to accommodate different user interpupillary distances. Optical module position adjustments may be automated or manual. The optical positioning system(s) of device 10 may use guide structures such as guide rods 50 to allow optical modules 40 to move along a desired axis. The guide rods and the mounting structures used to attach the guide rods to housing 12M (e.g., frame 12FC) may be sufficiently rigid and strong to resist deformation and misalignment in the event that device 10 is inadvertently dropped.

To reduce the burden on actuators 43 as actuators 43 rotate threaded rods 62 to move modules 40 along guide rods 50, guide rods 50 may be slidably coupled to modules 40 using low-friction structures. These low friction structures may include using low-friction coating materials such as nickel. The coating layer(s) may be polished (e.g., using a centerless grinding tool) and/or otherwise finished to help reduce friction. If desired, the use of nickel coating material may be omitted (e.g., when finishing rods 50 using burnishing, grinding, or polishing to provide a low-friction surface). The weight of guide rods 50, which may affect user comfort, may be reduced by using fiber-composite materials or other light materials in forming guide rod tubes 82.

An example of a finishing process that may be used to help reduce friction between modules 40 and rods 50 is superfinishing. Superfinishing is a microfinishing technique that can be used to enhance the surface finish of an item while also enhancing the accuracy of the contours of the item (e.g., enhancing the accuracy of the desired shapes of rods 50 such as enhancing the cylindricity of rods 50 and/or the accuracy of the desired shapes for the mating portions of modules 40). With superfinishing, small amounts of surface material (e.g., 1-2 microns) are removed by superfinishing equipment using abrasive. The surface of a superfinished item may be less smoothly polished than when the item is finished using smooth polishing equipment (e.g., there may be residual cross-hatched microscratches on the surface of a superfinished item due to oscillations and/or other movements of the abrasive and rotations of the item during finishing). By superfinishing or otherwise treating (e.g., by burnishing, grinding, polishing, etc.) one or more surfaces of parts that slide relative to each other (e.g., the surface of rods 50), wear may be decreased and smooth sliding operations may be ensured (with or without using coatings such as nickel coating layers).

Fiber-composite tubes may include multiple layers of fiber-composite material (e.g., carbon fiber layers with different fiber orientations). The fiber orientations used in the fiber-composite layers may be selected to enhance bending strength, hoop strength (resistance to tube crushing), and/or torsional strength. End caps 86 may have solid portions and/or hollow portions and may be formed from one or more metals, polymer, fiber-composite material, etc.

Low-friction coatings for tubes 82 (see, e.g., coating layers 116 of FIG. 16) may be formed from metals such as nickel, nickel cobalt, nickel iron, cobalt, chrome (e.g., a top coat of chrome to serve as a hard coat that reduces friction), and/or other low-friction durable (low-wear) coatings.

If desired, the fibers in tubes 82 may have different fiber orientations (layups) at different portions of tubes 82 (e.g., bending strength may be enhanced with fibers that run the length of tubes 82, torsional rigidity may be enhanced by fibers oriented +/−45° with respect to axis 80, and these fibers may be present along the entire length of tubes 82 or only parts of tubes 82), and/or crush/hoop strength may be enhanced using fibers that wrap around axis 80 (e.g., particularly at the ends of tubes 82 where tubes 82 are being attached to end caps 86).

Tubes 82 may, if desired, be provided with strength-enhancing members such as overmolded polymer strengthening members, bonded polymer and/or metal pieces, etc. The surface of tube 82 may be treated using acid, laser ablation, primer, sand blasting, and/or other treatments to enhance adhesion prior to overmolding operations.

Figure 17:
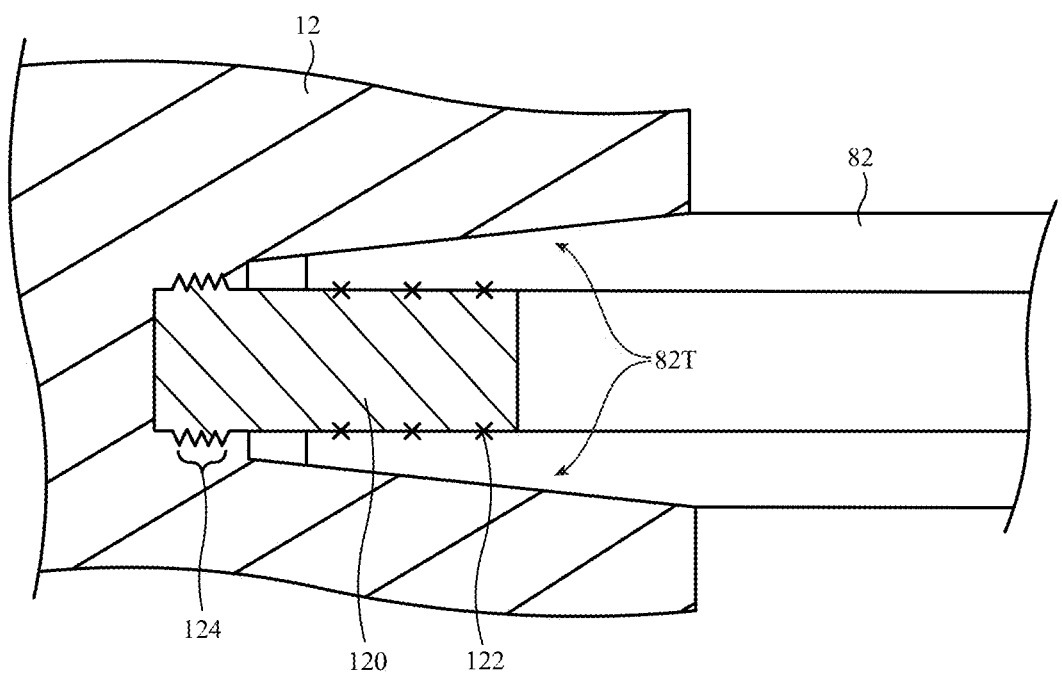
FIG. 17 is a cross-sectional side view of an illustrative tapered end portion of a guide rod in accordance with an embodiment.

If desired, tubes 82 may be provided with tapered portions. As shown in FIG. 17, for example, tube 82 may have tapered portions 82T that are formed by grinding and/or machining the end of tube 82. By forming a tapered outer surface formed at the end of tube 82, tube 82 may be precisely aligned with a mating tapered portion of housing 12 (e.g., a tapered opening in a portion of main housing portion 12M, a portion of frame 12FC, or other tapered portion of housing 12 that is machined or otherwise formed in the housing). Tapered tube 82 of FIG. 17 may be retained within the corresponding tapered opening of housing 12 using a press-fit connection, using adhesive, using fasteners, and/or using other suitable attachment mechanisms. In the example of FIG. 17, tube 82 has been provided with insert 120. Insert 120 may be a solid cylindrical member or a tube that is configured to be received within the end of the hollow center of tube 82. Adhesive 122 or other attachment mechanisms may be used to help attach insert 120 to tube 82. Insert 120 may be formed from metal or other suitable materials and may have threads 124 that mate with corresponding threads in housing 12. These threads provide axial retention for tube 82 (e.g., threads 124 help hold the tapered end of tube 82 into the corresponding tapered opening of housing 12). Adhesive may, if desired, be used to lock threads 124 in place, may be used to help attach the outer surface of tapered portion 82T to housing 12, and/or may otherwise be used to help reinforce the joint between tube 82 and housing 12.

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, μLEDs, liquid crystal on silicon, laser scanning light sources, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

What is claimed is:

1. A head-mounted device, comprising:
   a head-mounted housing including a frame center portion;
   left and right guide rods having respective first and second ends coupled to opposing sides of the frame center portion;
   left and right displays respectively coupled to the left and right guide rods; and
   left and right lenses respectively coupled to the left and right guide rods.

2. The head-mounted device defined in claim 1 wherein the frame center portion comprises a nose bridge portion.

3. The head-mounted device defined in claim 1 wherein the left and right lenses are respectively supported by left and right lens barrels.

4. The head-mounted device defined in claim 3 wherein the left and right lens barrels each comprise an opening lined with a low-friction coating that is configured to receive a respective one of the left and right guide rods.

5. The head-mounted device defined in claim 4 further comprising actuators configured to adjust a distance between the left and right lens barrels.

6. The head-mounted device defined in claim 1 wherein each of the left and right guide rods has a stop structure.

7. The head-mounted device defined in claim 1 wherein the left and right guide rods comprise hollow tubes.

8. The head-mounted device defined in claim 1 wherein the left and right guide rods comprise fiber-composite material.

9. The head-mounted device defined in claim 1 wherein the left and right guide rods are non-parallel with one another.

10. The head-mounted device defined in claim 1 wherein the left and right guide rods comprise low-friction coatings.

11. A head-mounted device, comprising:
a head-mounted housing;
a bent guide rod having left and right portions; and
left and right optical modules respectively coupled to the left and right portions of the bent guide rod, wherein the left and right optical modules each support a display and a lens.

12. The head-mounted device defined in claim 11 wherein the left and right portions are non-parallel with one another.

13. The head-mounted device defined in claim 11 wherein the left and right portions each comprise a stop structure.

14. The head-mounted device defined in claim 11 wherein the bent guide rod comprises a low-friction coating.

15. The head-mounted device defined in claim 11 wherein the left and right optical modules each comprise an opening lined with a low-friction coating and configured to receive a respective one of the left and right portions of the bent guide rod.

16. A head-mounted device, comprising:
a head-mounted housing;
left and right guide rods each having first and second opposing ends and having a stop structure at the second end;
left and right displays respectively coupled to the left and right guide rods; and
left and right lenses respectively coupled to the left and right guide rods.

17. The head-mounted device defined in claim 16 wherein the left and right lenses are supported by respective left and right lens barrels and wherein each of the left and right lens barrels comprises an opening lined with a low-friction coating and configured to receive a respective one of the left and right guide rods.

18. The head-mounted device defined in claim 17 further comprising actuators configured to adjust a distance between the left and right lens barrels.

19. The head-mounted device defined in claim 16 wherein the left and right guide rods are oriented at a non-zero angle with respect to each other.

20. The head-mounted device defined in claim 16 wherein the left and right guide rods comprise fiber-composite material.

* * * * *